(12) United States Patent
Hsieh

(10) Patent No.: US 8,392,638 B2
(45) Date of Patent: Mar. 5, 2013

(54) MASTER-SLAVE DEVICE COMMUNICATION CIRCUIT AND ID ADDRESS SETTING METHOD THEREOF

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 386 days.

(21) Appl. No.: 12/722,551

(22) Filed: Mar. 12, 2010

(65) Prior Publication Data

US 2011/0197000 A1  Aug. 11, 2011

(30) Foreign Application Priority Data

Feb. 5, 2010  (TW) ................................ 99103571 A

(51) Int. Cl.
 *G06F 13/00* (2006.01)
(52) U.S. Cl. ............. 710/104; 710/9; 710/301; 710/302
(58) Field of Classification Search ...... 710/9, 301–302, 710/104
See application file for complete search history.

(56) References Cited

U.S. PATENT DOCUMENTS 5,787,306 A * 7/1998 Michael ............................ 710/9
5,922,060 A * 7/1999 Goodrum ...................... 710/302

* cited by examiner

*Primary Examiner* — Nimesh G Patel
(74) *Attorney, Agent, or Firm* — Altis Law Group, Inc.

(57) ABSTRACT

A master-slave communication circuit includes a master device, a number of slave devices, and a bus providing communication channels between the master device and the slave devices. Each slave device includes an identification (ID) address setting unit, a plug-in detecting pin, and a plug-out detecting pin. The identification (ID) address setting unit is connected to the bus to receive an ID address setting signal transferred from the master device, and set an ID address to the corresponding slave device. The master sets the ID addresses of the slave devices according to voltage levels of the plug-in detecting pin and the plug-out detecting pin, to make the ID addresses of the slave devices connected to the bus are different.

2 Claims, 2 Drawing Sheets

MASTER-SLAVE DEVICE COMMUNICATION CIRCUIT AND ID ADDRESS SETTING METHOD THEREOF

BACKGROUND

1. Technical Field

The present disclosure relates to communication circuits, and particularly, to a communication circuit which connects a master device with a plurality of slave devices, and an identification (ID) address setting method of the communication circuit.

2. Description of Related Art

Master devices transmit data to slave devices by using ID addresses of the slave devices. Slave devices receive data correspondingly and transmit response data to the master devices.

In early control systems, the process of setting ID addresses is achieved through the use of two rotary address switches set using a decimal format. A control system can include up to several thousand slave devices, setting the addresses of the slave devices is time consuming, and the possibility of mistakes is increased.

DETAILED DESCRIPTION

Figure 1:
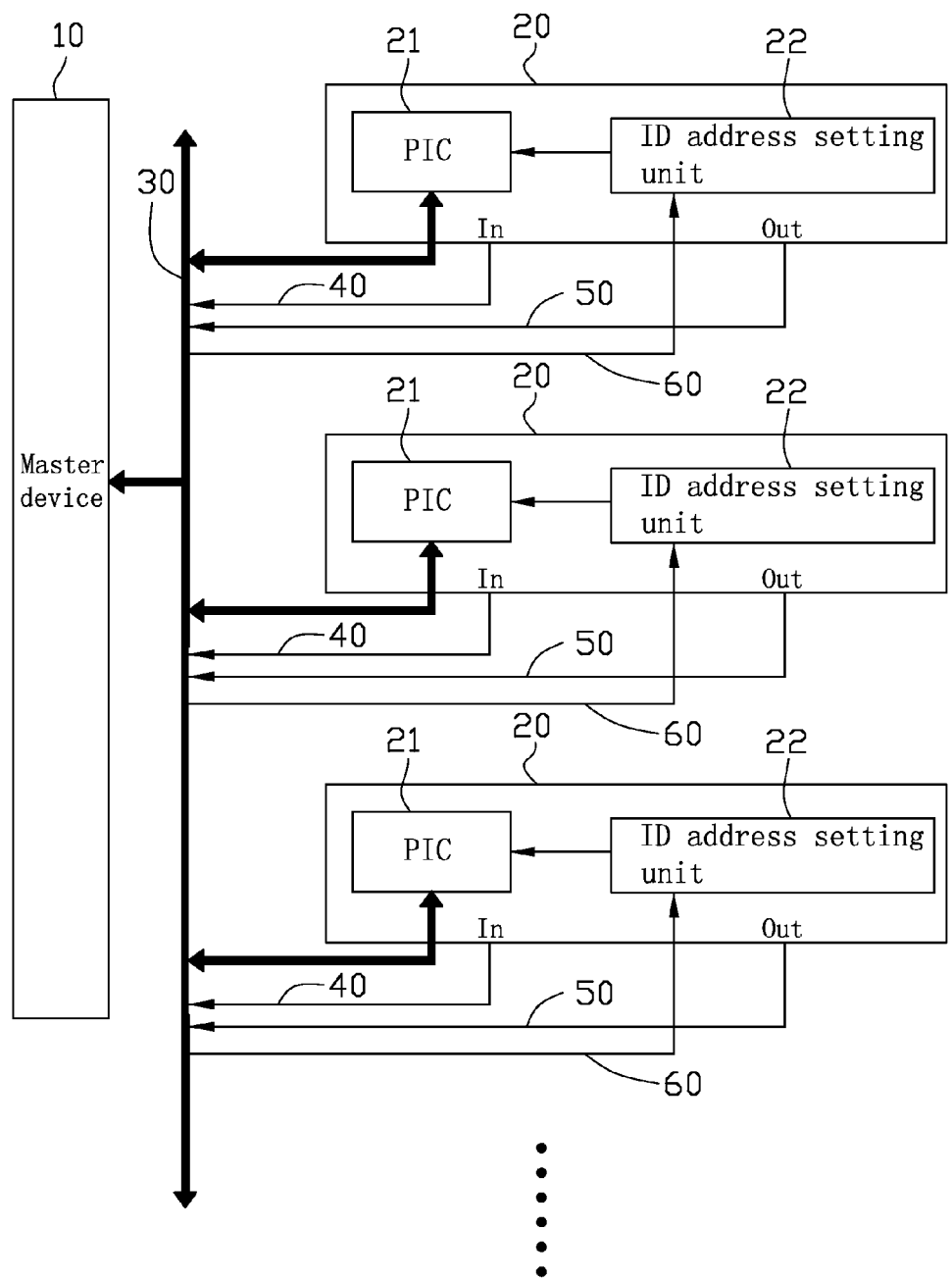
FIG. 1 is a block diagram of an exemplary embodiment of a master-slave communication circuit.

Referring to FIG. 1, an exemplary embodiment of a master-slave communication circuit includes a master device 10, such as a central processing unit, and a plurality of slave devices 20. Each slave device 20 includes a peripheral interface controller (PIC) 21, an identification (ID) address setting unit 22, a plug-in detecting pin In, and a plug-out detecting pin Out. It may be understood that the slave device 20 also includes other circuits, such as a power circuit, for example. These other circuits fall within well-known technologies, and are therefore not described here.

The master device 10 is connected to the PIC 21 of each slave device 20 via a bus 30, to communicate with the slave device 20. The plug-in detecting pin In of each slave device 20 is connected to the bus 30 via a signal line 40, to transfer a plug-in signal to the master device 10, thereby the master device 10 detects the slave device 20 connected to the bus 30. The plug-out pin Out of each slave device 20 is connected to the bus 30 via a signal line 50, to transfer a plug-out signal to the master device 10, thereby the master device 10 detects when the slave device 20 is not connected to the bus 30. The ID address setting unit 22 of each slave device 20 is connected to the bus 30 via a signal line 60, to receive an ID address setting signal from the master device 10, and set an ID address to the PIC 21 according to the ID address setting signal.

In one embodiment, the plug-in signal is a high voltage signal, such as a 5 volt (V) power signal of the slave device 20. A low voltage signal is transferred to the master device 10 through the signal line 50 when the plug-out pin Out of the corresponding slave device 20 is not disconnected from the bus 30. An idle signal is formed at the plug-out detecting pin Out of the slave device 20 when the corresponding slave device 20 is not connected to the bus 30, and the master device 10 receives no signal from the signal line 50. The ID address setting unit 22 may include a pulse generator, a counter, and a plurality of light-emitting diodes (LEDs) which are not shown. The pulse generator is used to receive the ID address setting signal and transfer it to the counter. The counter generates a corresponding ID address signal to the PIC 21. At this time, the plurality of LEDs indicate a corresponding code. In other embodiments, the ID address setting unit 22 may include other circuits to achieve the above functions to set an ID address to the PIC 21.

Figure 2:
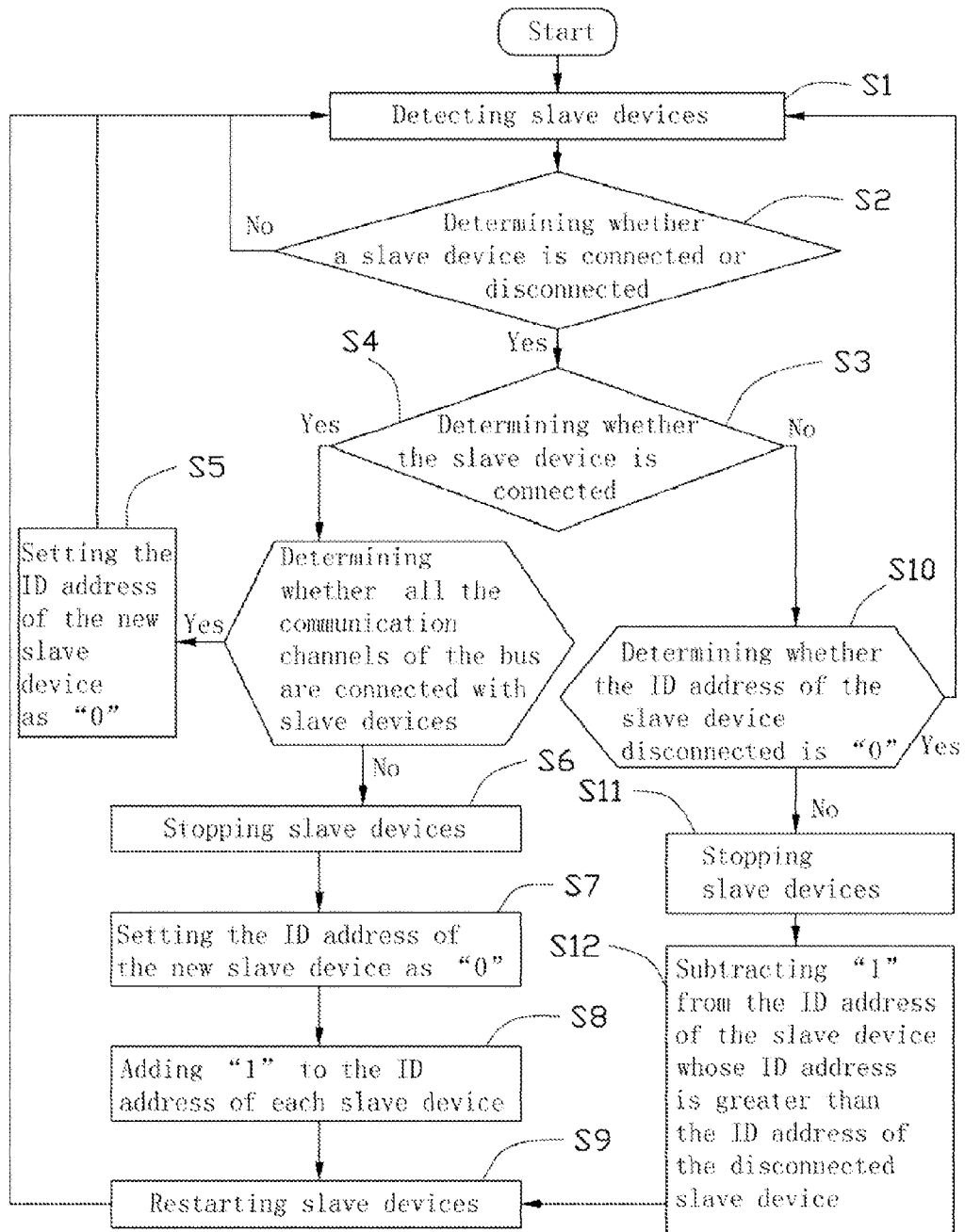
FIG. 2 is a flow chart of an exemplary embodiment of an identification (ID) address setting method.

Referring to FIG. 2, an exemplary embodiment of an identification (ID) address setting method includes the following steps.

In step S1, the master device 10 detects slave devices 20.

In step S2, the master device 10 determines whether a new slave device 20 is connected to the bus 30 or a connected slave device 20 is disconnected from the bus 30. If a new slave device 20 is connected to the bus 30 or a slave device 20 is disconnected from the bus 30, the process goes to step S3. Otherwise, the process goes back to step S1.

In step S3, the master device 10 determines whether a new slave device 20 is connected in the bus 30. If yes, the process goes to step S4. If no, the process goes to step S10.

In step S4, the master device 10 determines whether all the communication channels of the bus 30 are connected with slave devices 20. If yes, the process goes to step S5. If no, the process goes to step S6.

In step S5, the master device 10 transfers an ID address signal to the ID address setting unit 22 of the new slave device 20, to set the ID address of the new slave device 20 as "0", and the process goes back to step S1.

In step S6, the master device 10 stops the slave devices 20 connected to the bus 30.

In step S7, the master device 10 transfers an ID address signal to the ID address setting unit 22 of the new slave device 20, to set the ID address of the new slave device 20 as "0".

In step S8, the master device 10 transfers ID address signals to the ID address setting units 22 of the slave devices 20 connected to the bus 30, to add "1" to the ID addresses of the slave devices 20 connected to the bus 30, respectively.

In step S9, the master device 10 restarts the slave devices 20 connected to the bus 30, and the process goes back to step S1.

In step S10, the master device 10 determines whether the ID address of the disconnected slave device 20 is "0". If yes, the process goes back to step S1. If no, the process goes to step S11.

In step S11, the master device 10 stops the slave devices 20 connected to the bus 30.

In step S12, the master device 10 transfers ID address signals to the slave devices 20 whose ID addresses are greater than the ID address of the disconnected slave device 20, to subtract "1" from the ID addresses of the slave devices 20 whose ID addresses are greater than the ID address of the disconnected slave device 20, respectively.

For example, when the master device 10 is connected to five slave devices 20 (here defined as A, B, C, D, E) through the bus 30, the ID addresses of the five slave devices 20 are "1", "2", "3", "4", "5", respectively. If another slave device 20 (defined as F) is connected to the bus 30, the master device 10 stops the slave devices 20 (A, B, C, D, E, F), sets the ID address of the slave device 20 (F) as "0", adds "1" to the ID addresses of the slave devices 20 (A, B, C, D, E, F), respectively. Therefore, the ID addresses of the slave devices 20 (A, B, C, D, E, F) are changed from "1", "2", "3", "4", "5" "0" to "2", "3", "4", "5", "6", "1", respectively. The master device 10 restarts the slave devices 20 (A, B, C, D, E, F). In contrast, if a connected slave device 20 (assuming C) is disconnected from the bus 30, the master device 10 determines whether the ID address of the slave device 20 (C) is "0". Because the ID address of the slave device 20 (C) is "3", the master device 10 stops the slave devices 20 (A, B, D, E), subtracts "1" from the ID addresses of the slave devices 20 (D, E) whose ID addresses are greater than "3", respectively. Therefore the ID addresses of the slave devices 20 (A, B, D, E) are changed from "1", "2", "4", "5" to "1", "2", "3", "4". Whether the slave devices 20 are connected to disconnected from the bus 30, the ID addresses of the slave devices 20 are different, and this setting method is very convenient.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A master-slave communication circuit comprising:
   a master device;
   a bus; and
   a plurality of slave devices, the bus providing communication channels between the master device and the plurality of slave devices, each of the plurality of slave devices comprising:
     an identification (ID) address setting unit connected to the bus to receive an ID address setting, signal transferred from the master device, and set an ID address to a corresponding one of the plurality of slave devices;
     a plug-in detecting pin connected to the bus to transfer a plug-in signal to the master, to make the master device detect the corresponding one of the plurality of slave devices which is connected to the bus; and
     a plug-out detecting pin connected to the bus to make the master device detect the corresponding one of the plurality of slave devices which is disconnected from the bus;
   wherein when a new slave device is connected to the bus and all of the communication channels are connected with slave devices, the master device transfers an ID address signal to the ID address setting unit of the new slave device, to set the ID address of the new slave device as "0"; when a new slave device is connected to the bus and not all of the communication channels are connected with slave devices, the master device stops the slave devices, transfers an ID address signal to the ID address setting unit of the new slave device to set the ID address of the new stave device as "0", and adds "1" to the ID addresses of all of the slave devices which are connected to the bus; the master device restarts the slave devices connected to the bus;
   when a slave device is disconnected from the bus and the ID address of the disconnected slave device is not "0", the master device stops the slave devices which are connected to the bus, and transfers ID address signals to the slave devices whose ID addresses are greater than the ID address of disconnected the slave device, to subtract "1" from each of the ID addresses of the slave devices whose ID addresses are greater than the ID address of the disconnected slave device, then the master device restarts the slave devices connected to the bus.

2. An identification (ID) address setting method of a master-slave communication circuit comprising a master device, a plurality of slave devices, and a bus providing communication channels between the master device and the plurality of slave devices, the ID address setting method comprising:
   S1: detecting the plurality of slave devices;
   S2: determining whether a new slave device is connected to the bus or a connected slave device is disconnected from the bus, if no, going back to the step S1, if there is new slave device connected to the bus, going to step S3, and if there is a connected slave device disconnected from the bus, going to step S7;
   S3: determining whether all the communication channels of the bus are connected with slave devices, if yes, going to step S4, if no, going to step S5;
   S4: transferring an ID address signal to an ID address setting unit of the new slave device, to set an ID address of the new slave device as "0", and then going back to the step S1;
   S5: stopping ail of the slave devices which are connected to the bus; transferring an ID address signal to an ID address setting unit of the new slave device, to set the ID address of the new slave device as "0" adding "1" to ID addresses of all of the slave devices which are connected to the bus; and then going to step S6;
   S6: restarting all of the slave devices which are connected to the bus, and going back to the step S1;
   S7: determining whether an ID address of the disconnected slave device is "0" if yes, going back to the step S1, and if no, going to step S8;
   S8: stopping all of the slave devices which are connected to the bus, subtracting "1" from each of the ID addresses of the slave devices whose ID addresses are greater than the ID address of the disconnected slave device, and then going back to the step S6.

* * * * *